SPARK GAP DEVICES

Original Filed Jan. 24, 1961 2 Sheets-Sheet 1

Inventor
BRUCE C. HICKS

By Watson, Cole, Grindle & Watson
Attorneys

SPARK GAP DEVICES
Original Filed Jan. 24, 1961 2 Sheets-Sheet 2
Fig. 3.
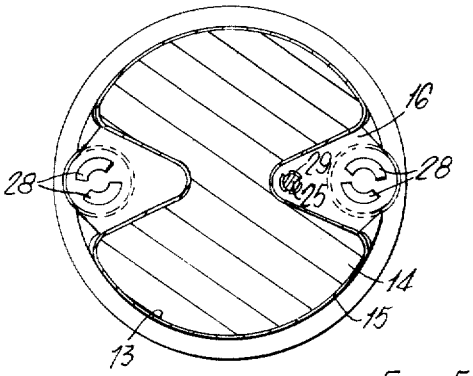
Fig. 5.
Fig. 4.
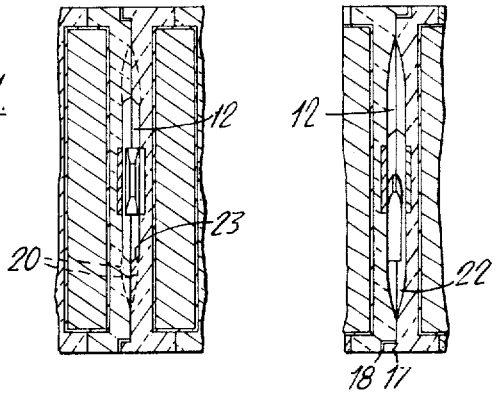
Inventor
Bruce C. Hicks
By Watson, Cole, Grindle & Watson
Attorneys United States Patent Office Re. 25,982
Reissued Mar. 22, 1966

25,982
SPARK GAP DEVICES

Bruce Clifford Hicks, Caringbah, New South Wales, Australia, assignor to E.M.P. Electric Limited Original No. 3,076,114, dated Jan. 29, 1963, Ser. No. 84,678, Jan. 24, 1961. Application for reissue Jan. 11, 1965, Ser. No. 438,808
22 Claims. (Cl. 313—161)

Matter enclosed in heavy brackets [ ] appears in the original patent but forms no part of this reissue specification; matter printed in italics indicates the additions made by reissue.

The present invention relates to improvements in spark gap devices, particularly but not exclusively for use in conjunction with electric surge diverters and lightning arresters such as are provided on electric power lines.

Lightning arresters and surge diverters as used on power lines normally comprise a series of non-linear resistor blocks with one or more spark gap units in series therewith, the gap units having the function of flashing over on the occurrence of a surge and under these conditions the non-linear resistor blocks provide a comparatively low resistance path to earth for the surge current but it necessarily follows that they then provide a path to earth for power current. It is necessary to terminate the resulting power current as rapidly as possible. Comparatively substantial power currents may be involved because, for other considerations, it is desirable that the resistor blocks shall have a comparatively low resistance under surge conditions. The ability to terminate the flow of power current is a function of the properties of the non-linear resistor blocks and of the characteristics of the spark gap unit or units. It is important that the spark gap components shall not be permanently affected under surge-carrying conditions, for example the current should be interrupted at the spark gap electrodes without causing any permanent damage to the sparking surface of said electrodes so that the diverter or arrester shall be capable of repeated operation without any change in its characteristics.

The primary object of the present invention is to provide a spark gap unit capable of fulfilling these requirements and which, more specifically, is adapted to interrupt a comparatively heavy flow of power currents through the arrester following the passage of a surge to earth through the non-linear resistor blocks, while a further object is to provide a construction which involves substantially no deterioration of the spark gap as a result of its action in terminating the flow of power current through the gap.

It has been proposed heretofore to utilise a ring-shaped magnet adjacent a circular gap structure for the purpose of imparting a circular motion to the discharge between the electrodes and thus preventing arcing being concentrated at one point of the peripheral gap, and a more specific object of the invention is to provide a compact, efficient and generally improved construction utilising a permanent magnet adjacent the gap.

In accordance with the present invention a spark gap unit for a surge diverter or lightning arrester comprises electrodes disposed side-by-side in a relatively shallow chamber and a flat plate-like permanent magnet, oppositely polarised on its two faces, is provided on each side of said chamber. In consequence of this arrangement a spark or arc initiated between said electrodes is drawn outwardly into the chamber and is thus rapidly cooled and quenched.

In the preferred arrangement each gap unit comprises a number of arcing chambers arranged one above the other each having appropriate electrodes therein so as to form a multiple series gap, and the plate magnets are disposed alternately between the arcing chambers. A series of grading resistors and/or capacitors may also be provided connected electrically to the successive electrodes so as to maintain a predetermined grading voltage between the successive gaps formed between the electrodes.

A plurality of discs of ceramic or other suitable material may be assembled in facial contact, each of said discs having a depression on one face capable of forming an electrode chamber in conjunction with a similarly formed face of an adjacent disc, and, on the other face, a depression adapted to form a chamber to accommodate a permanent magnet in conjunction with the corresponding face of another similarly formed disc on the other side.

One embodiment of spark gap assembly according to the present invention is shown by way of example on the accompanying drawing in which:

FIG. 3 is a section on the line III—III in FIG. 1,

FIG. 4 is a section on the line IV—IV in FIG. 2, and

FIG. 5 is a section on the line V—V in FIG. 2.

Figure 1:
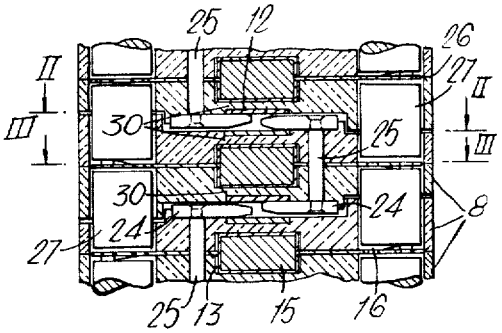
FIG. 1 is a central longitudinal section of part of a spark gap assembly, taken on the line I—I of FIG. 2.

In the construction illustrated on the drawing the gap unit is formed by the assembly of a series of heat resistant discs 8 in facial contact. These discs may be formed from an alumina-based ceramic or the material known under the trade name "Micalex." Each disc is recessed on one face (shown in FIG. 2) to provide half of a shallow chamber 12, conveniently of four-lobed shape, and is recessed on its other face to provide one half of a chamber 13 of generally circular shape but with deep non-recessed peninsular portions at diametrically opposite points. This chamber accommodates a permanent magnet 14 of generally circular shape with deep cut-outs as shown in FIG. 3 and of the same shape as the chamber 13; it will be noted that the magnets cover the whole area of the arcing chambers 12.

The magnet 14 preferably consists of a ferrite because of the low permeability and high coercive force shown by such materials. The magnet is surrounded by a magnet shield 15 in the form of flanged metal pressings each fitting snugly within one half section of the chamber 13, two such shields thus completely enclosing each magnet 14. One shield of each such pair has a web extending across the cut-out portions to form contact blades 16 for the purpose explained hereinafter. Each of the magnets is oppositely polarised on its two faces and adjacent magnets are arranged so that adjacent faces are oppositely polarised to provide a powerful field in the chambers 12 capable of providing for rapid quenching of any spark or arc formed in said chambers.

The face of each disc providing one half of the chamber 12 embodies a raised rim portion 17 extending over half its peripheral span and a corresponding rebate 18 extending over the other half of the peripheral span and arranged so that when the discs are assembled the rim portion 17 of one disc fits to the rebate portion 18 of the adjoining disc and vice versa, as indicated on FIGS. 1, 4 and 5. It will be seen that these inter-engaging rim portions and rebates provide registration and ensure a peripheral seal around the chamber 12 to prevent arc penetration.

Figure 2:
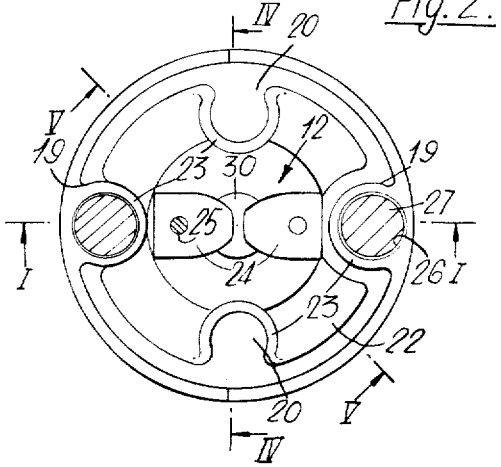
FIG. 2 is a section on the line II—II in FIG. 1.

The general shape of the chamber 12 will be appreciated from FIG. 2 from which it will be seen that four boss-like portions 19, 20 (i.e. parts co-planar with the meeting faces of the discs 8) define the four-lobe formation of the chamber, the peripheral parts of which are of tapered formation as clearly indicated at 21 on FIGS. 4 and 5. These tapered portions are formed by sloping lands 22 defining the maximum dimension portions of the chamber and by chamfered walls 23 flanking the bosses 19 and 20.

The chamber 12 houses a pair of electrodes 24, preferably of copper, of approximately triangular form, the actual spark gap being formed at the axis of the assembly between adjacent, suitably spaced end parts of the electrodes. The electrodes are connected together in pairs by means of connector members 25, as indicated for example in FIG. 1 of the drawings, so that all the spark gaps in the assembly are arranged in series. The members 25 are preferably also of copper.

Each of the ceramic discs 8 is provided with at least one circular aperture 26 formed within at least one of the bosses 19 and preferably both of said bosses are provided with such apertures 26 as specifically shown on the drawings. On assembly of the discs these apertures provide a tunnel or tunnels adapted to houes a series of grading elements to ensure proper distribution of voltage across the several gaps. Conveniently, and as shown in the drawings, one of said tunnels serves to house a series of non-linear resistor grading blocks 27, each of which is designed to be positioned between adjacent pairs of contact blades 16. The latter are provided with pressed out springy tongue members 28 adapetd to provide electrical contact with the grading blocks [26], *27* and similarly, with an aperture bounded by springy tongue portions 29 adapted to engage the connecting members 25 between adjacent pairs of electrodes.

Where a second tunnel is formed this second tunnel is used to house capacitive grading elements which are arranged mechanically in the same way as the resistor grading blocks 27. Such capacitive grading elements may for example consist of rods of barium titanate with metallised ends. The two tunnels may however both be utilised to house grading resistors 27 according to the desired operating properties.

Located centrally in each half section of the electrode accommodating chamber 12 there is preferably provided a depression adapted to accommodate circular pole pieces 30 positioned in the immediate vicinity of the gap between the electrodes 24, which serve to concentrate the magnetic field at this point and thereby ensure that the arc formed between the electrodes moves outwardly at the earliest possible moment.

These pole pieces 30 may consist of a ferrite high permeability material (such as the material known under the trade name "Ferroxcube"), and/or a high dielectric ceramic wafer, for example of barium titanate. It serves to pre-stress the gap area between the electrodes 24 and permits a low impulse ratio to be obtained for the gap.

For certain applications or for certain ratings additional shields, for example of radio metal, may be accommodated in the discs 8 beneath the magnets 14 and shields 15 in suitable shallow depressions. Such discs may be of generally elliptical shape with their major axes in the plane containing the connector member 25 between adjacent pairs of electrodes. Such additional shields may consist of radio metal or similar high permeability material.

Figure 1A:
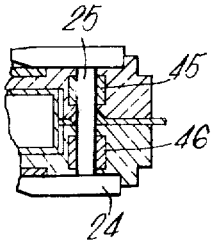
*FIGURE 1a is a fragmentary view in section of a portion of FIGURE 1,*

Further, in some cases the connector members 25 between adjacent pairs of electrodes may themselves be surrounded by magnetic shields consisting of sleeves of a suitable magnetic material such as soft iron or mild steel, which are insulated from the connector members, separate shields *45, 46* [being] for example, *as shown in FIGURE 1a, being* disposed around the connector member 25 on the two sides of the contact spring 16 which is in electrical contact through the spring elements *29* [25] with said connector member, the sleeves being insulated from the connector members, from the electrodes and from the contact springs.

Since the permanent magnets 14 are oppositely polarised on the two faces looking towards each chamber 13, any spark forming at the gap between the electrodes 24 following the discharge of a surge current through the spark gap is subjected to a very intense magnetic field. The spark or arc initiated between said electrodes is drawn outwardly into the chamber 12 and is thus rapidly cooled and quenched. The pole pieces 30 concentrate the field as already indicated over the area of the actual gap between the electrodes 24 and assist in securing immediate displacement of the arc. The grading resistors 27, in some cases in conjunction with the capacitive grading elements, ensure proper distribution of the voltage to the several spark gaps in series so as to maintain a predetermined voltage gradient between the successive gaps between the electrodes. The shields 15 are formed of metal of good electrical conductivity to protect the magnets against heavy current surges, and have the additional function of cooling the grading resistors and providing a predetermined gap to gap capacitance so that by modification of the size of the members 15 it becomes possible to control the impulse spark-over characteristic of the gap assembly which is mainly determined by the distribution of capacitance along the assembly, and this distribution can be more readily controlled where capacitive grading elements are provided as already indicated.

What I claim is:

1. A spark gap unit for a surge diverter or lightning arrester comprising a plurality of [heat-resisting] *heat-resistant* insulating discs assembled in mutual contact, each disc having a depression of sinuous peripheral form on one face *having interengaging rim portions,* pairs of said discs being placed with said depressions facing one another *with the rim portions interlocked* to form a shallow electrode chamber of sinuous peripheral form *with a closed peripheral seal,* opposed pairs of spark gap electrodes in each electrode chamber and flat permanent magnets disposed on the faces of said discs opposite to said depressions respectively, said magnets being oppositely polarized on opposite faces *in a polarity urging the spark gap outwardly towards the closed periphery of said chamber.*

2. A spark gap unit according to claim 1 wherein connector members are provided between pairs of electrodes in adjacent electrode chambers, [said connecting members being engaged by springy finger portions bounding an aperture in the contact blade formed by the web of the magnetic shields surrounding the magnets at the cut-away portions of said magnets] *the magnets have cut-away portions, shields surrounding the magnets with a web at the cut-away portions defining apertures bounded with springy finger portions forming contact blades engaging the connector members.*

3. A spark gap unit according to claim 1, wherein [said depressions are of plural-lobed form] *the sinuous peripheral form comprises plural lobes formed in at least one of said discs to extend from said interlocking rim portions into said depressions.*

4. A spark gap unit according to claim 1 *wherein said* [comprising] permanent magnets of generally circular form with diametrically opposed deep cup-outs, said permanent magnets being housed in chambers formed between opposed pairs of discs opposite in each case respectively to the faces having depressions forming the electrode chambers, each depression comprising opposed pairs of peninsulae fitting the *cut-outs* [depressions] in the permanent magnets.

5. A spark gap unit according to claim 1, wherein each permanent magnet is enclosed by flanged shell-like conductive metal shields, *means electrically connecting the shields to said electrodes,* each magnet being enclosed by two such shields.

6. A spark gap unit according to claim 1 comprising flanged shell-like conductive metal shields enclosing each permanent magnet, each magnet being enclosed by two such shields, a web portion on one of said shields extending across the cut-out portions of each magnet, a series of voltage grading components located in tunnel-like housings towards the edges of said discs and contact blades formed in said web portions for electrical contact with said grading components.

7. A spark gap unit according to claim 1, comprising permanent magnets having diametrically opposed deep cut-outs, said permanent magnets being enclosed in chambers formed in depressions in opposed pairs of said discs, *peninsular* [peninsulae] portions formed in said opposed depressions to fit within said opposed cut-outs on the permanent magnets, tunnel-like portions formed in said *peninsular portions* [peninsulae] to form a continuous tunnel throughout said discs, a series of voltage grading components housed in said *tunnel-like portions* [tunnel], shell-like conductive metal shields surrounding said permanent magnets, said shields including a web portion extending across the cut-outs in said permanent magnets and intersecting said *tunnel-like portions* [tunnel], successive grading components being disposed between adjacent pairs of said web portions, contact elements in said web portions in electrical contact with said grading components, connecting means from the said electrodes passing through the discs for connection with adjacent electrodes in series order, said connecting means traversing the said webs and electric contact means on said webs in engagement with said connecting means.

8. A spark gap unit according to claim 7 wherein the grading components consist of grading resistors, successive components of which are located in said *tunnel-like portions* [tunnels], each component being disposed between the contact blades of the shields surrounding the permanent magnets so as to form a continuous path through the unit with intermediate connection to the shields, and said shields being further connected electrically to connector members extending between the electrodes of adjacent gap units.

9. A spark gap unit according to claim 8 wherein the contact blades are provided with springy tongue-like portions on both faces for engagement with the grading elements on both sides thereof.

10. A spark gap unit according to claim 7, wherein said connecting means are surrounded by magnetic shields insulated both from said connecting means and also from the electrodes and the contact elements.

11. A spark gap unit according to claim 1 comprising pole pieces positioned within the electrode chamber adjacent the gap between opposed pairs of electrodes.

12. A spark gap unit for a surge diverter or lightning arrester comprising a plurality of [heating-resisting] *heat-resistant* insulating discs assembled in mutual contact, each disc having a depression of sinuous peripheral form on one face and a depression of circular configuration on the other face, said discs being assembled in opposed pairs to form a successive series of electrode chambers of sinuous peripheral form and a series of permanent magnet-receiving chambers of generally circular configuration, the electrode chambers and the permanent magnet-receiving chambers being in alternating sequence, pairs of electrodes located in each electrode chamber, the pairs of electrodes being connected in series order by connecting means extending through the discs and flat permanent magnets disposed in said magnet-receiving chambers, said magnets being oppositely polarized on opposite faces of each of them respectively, whereas the mutually opposing faces of adjacent pairs *of magnets* are oppositely polarized to provide a magnetic field transversely across the electrode chambers.

13. A spark gap unit according to claim 12, wherein each disc comprising half sections of the electrode chamber and of the permanent magnet chamber respectively, [are] *is* provided with a depending rim extending over half the periphery and a rebate extending over the other half of the periphery so that adjacent pairs of discs fit one to the other and provide a peripheral closure for the electrode chamber.

14. A spark gap unit as claimed in claim 12, wherein each permanent magnet is provided with diametrically opposed deep cut-outs, comprising [peninsulae] *peninsular* portions formed in each magnet-receiving chamber and fitting in said deep cut-outs, conductive metal shields surrounding each permanent magnet, said metal shields including web-like portions extending across said deep cut-outs, voltage grading components located in openings in each disc, all said openings coming into alignment to form a tunnel to receive said grading components, said grading components being each positioned between adjacent pairs of web portions, contact elements in said web portions in electrical contact with said grading components, connecting means between adjacent electrodes traversing said web-like portions in electrical contact therewith and pole pieces fitted in said electrode chambers adjacent said electrodes.

15. A spark gap unit according to claim 7, wherein the grading components consist of grading capacitors, successive components of which are located in tunnels, each component being disposed between the contact blades of the shields surrounding the permanent magnets so as to form a continuous path through the unit with intermediate connection to the shields, and said shields being further connected electrically to connector members extending between the electrodes of adjacent gap units.

*16. A spark gap unit for a surge diverter or lightning arrester comprising a plurality of heat-resistant insulating discs assembled in mutual insulation to insulation contact at the periphery to form a closed chamber with a sealed periphery, each disc having a structure of sinuous peripheral form on one face extending into the chamber from said sealed periphery, pairs of said discs being placed with said structures facing one another in a stack to form shallow electrode chambers of sinuous peripheral form, an opposed pair of spark gap electrodes in each electrode chamber and magnetic means disposed between two of said electrode chambers, said magnetic means being oppositely polarized on opposite faces to produce a magnetic field within chambers on either side in such polarity that a spark between said electrodes will be directed toward said sealed periphery.*

*17. A spark gap unit according to claim 1, wherein the spark gap electrodes are placed symmetrically within each electrode chamber and the said structure is arranged to provide plural-lobed chamber portions on each side of said electrodes extending from the sealed periphery into said shallow electrode chambers.*

*18. A spark gap unit according to claim 16, wherein said magnetic means are permanent magnets disposed between two said electrode chambers and further comprising magnetic shields surrounding the permanent magnets, said magnets and said shields being provided with peripheral cut-away portions, and connector members between pairs of electrodes in adjacent electrode chambers, said connecting members being engaged by springy finger portions bounding an aperture in the contact blade, said finger portions formed by a web of the magnetic shields surrounding the magnets at the cut-away portions of said magnets.*

*19. A spark gap unit for a surge diverter or lightning arrester comprising a plurality of heat-resistant insulating discs assembled in mutual insulation to insulation contact, each disc having a structure of sinuous peripheral form on one face and a structure of circular configuration on the other face, said discs being assembled in opposed pairs to form a successive series of electrode chambers of sinuous peripheral form and at least one magnet-receiving structure of generally circular configuration in said discs disposed between two of said electrode chambers, pairs of electrodes located in each electrode chamber, the pairs of electrodes being connected in series order by con-*

*necting means extending through the discs and magnetic means disposed in said magnet-receiving structure, said magnetic means being oppositely polarized on opposite sides to provide a magnetic field transversely across the electrode chambers.*

*20. A spark gap unit for a surge diverter or lightning arrester comprising a plurality of ceramic insulating discs assembled in mutual ceramic to ceramic contact, said discs having opposed faces defining an enclosure within a substantially closed cylindrical ceramic casing comprising a successive series of shallow electrode chambers of sinuous peripheral form, a pair of spark gap electrodes in each electrode chamber, recesses in said discs between at least one pair of adjacent electrode chambers, magnetic means disposed in said recesses to provide a magnetic field within said chambers on either side thereof so that an arc formed between the electrodes moves towards the sinuous peripheral form under the influence of the magnetic field, apertures defined by said discs extending therethrough into said chambers, and interconnecting means extending through said apertures in the discs to connect the pairs of electrodes in series order.*

*21. A spark gap unit for a surge diverter or lightning arrester comprising a plurality of heat-resistant ceramic discs assembled in mutual ceramic to ceramic contact, including a disc having a depression of sinuous peripheral form on at least one face, said discs being assembled in opposed pairs to form a substantially closed cylindrical ceramic body having therein a successive series of electrode chambers of sinuous peripheral form, at least one magnet-receiving space disposed between two of said chambers, pairs of electrodes positioned in each electrode chamber, the pairs of electrodes being connected in series order by connecting means extending through the discs, and magnet devices disposed in said magnet-receiving spaces to provide a magnetic field transversely across the electrode chambers on either side of the magnet-receiving spaces.*

*22. A spark gap unit for a surge diverter or lightning arrester comprising a plurality of heat-resistant apertured ceramic discs assembled in mutual contact in a stack to comprise a substantially cylindrical ceramic body, the discs having a plural-lobed sinuous peripheral depression area on at least one face thereof, the depression area forming with said lobes a successive series of shallow electrode chambers of sinuous peripheral form, a pair of spark gap electrodes mounted in each electrode chamber, a magnetic structure disposed between an adjacent two of said chambers in said ceramic body to pass a magnetic field through the depression areas on either side of the magnetic structure with opposite magnetic poles on opposite sides of the electrodes so that an arc formed between the electrodes moves towards the series of shallow electrode chambers under the influence of the magnetic field, and interconnecting means extending through said apertured discs to interconnect the pairs of electrodes in series order.*

References Cited by the Examiner

The following references, cited by the Examiner, are of record in the patented file of this patent or the original patent.

UNITED STATES PATENTS

| | | | |
|---|---|---|---|
| 2,151,559 | 3/1939 | McEachron. | |
| 2,825,008 | 2/1958 | Kalb | 317—70 |
| 2,862,132 | 11/1958 | Dyer | 313—156 |
| 2,906,910 | 9/1959 | Dyer et al. | 313—156 |

FOREIGN PATENTS

| | | |
|---|---|---|
| 668,907 | 12/1938 | Germany. |

DAVID J. GALVIN, *Primary Examiner.*

GEORGE N. WESTBY, *Examiner.*

V. LAFRANCHI, *Assistant Examiner.*